Aug. 14, 1956
R. C. OWENS
2,758,509
REAR VIEW MIRROR ATTACHMENTS
Filed April 18, 1952
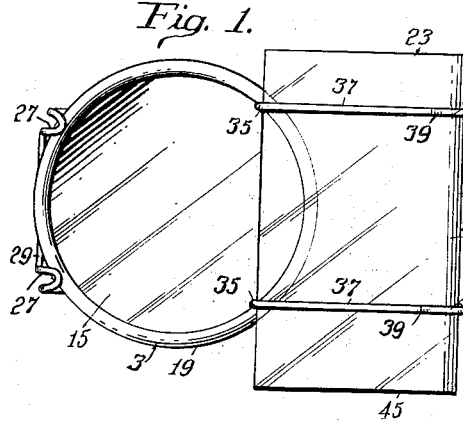
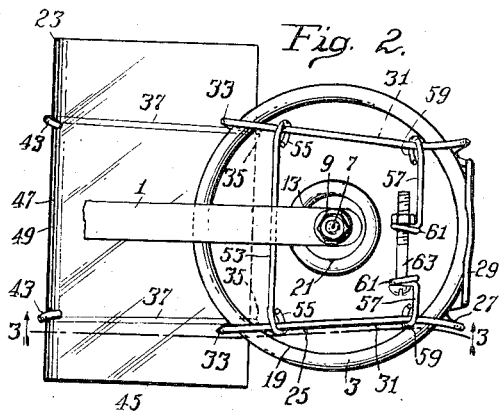
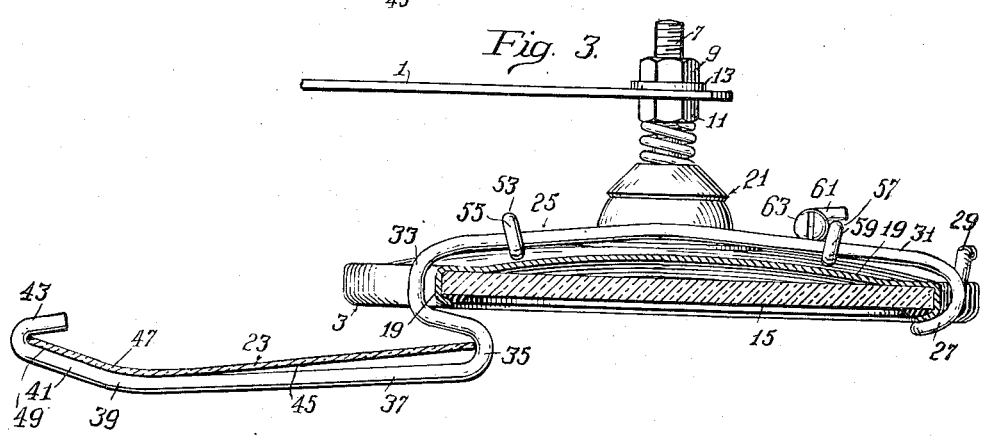
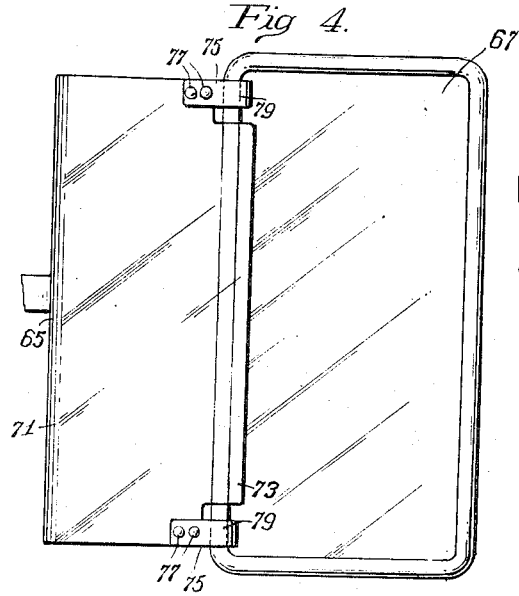
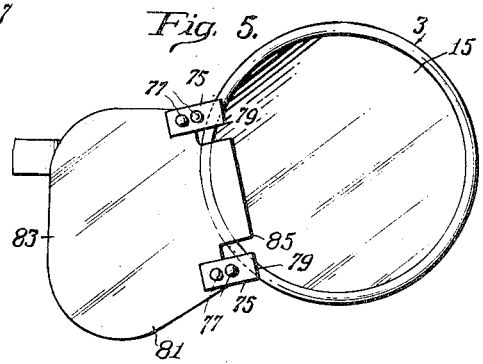
INVENTOR
Roy C. Owens
BY *Cyrus Kehr & Sweecker*
ATTORNEYS United States Patent Office 2,758,509
Patented Aug. 14, 1956

2,758,509
REAR VIEW MIRROR ATTACHMENTS
Roy C. Owens, Knoxville, Tenn.
Application April 18, 1952, Serial No. 282,939
2 Claims. (Cl. 88—98)

This invention relates to improvements in rear view mirror attachments of automotive and other types of vehicles, and more specifically, the invention pertains to a device for removing condensation from the rear view mirrors of automobiles, trucks, and other vehicles, mounted thereon and projecting exteriorly thereof.

One of the primary objects of this invention is to provide an attachment for externally mounted vehicle rear view mirrors which will remove fog, moisture, or condensation therefrom in order that the vehicle operator may obtain a clear reflected image.

Another object of this invention is to provide an accessory for an externally positioned rear view mirror of an automotive vehicle which serves to remove continuously condensation from the reflected surface of the mirror as the vehicle moves forwardly, this object being achieved by directing a continuous flow of air across the reflecting surface of the mirror.

A further object of this invention resides in the provision of an attachment for externally positioned rear view mirrors comprising an air scoop for directing a continuous flow of air across the reflecting surface of the mirror as the vehicle travels in a forward direction.

Another object of this invention is to provide a device of the type described which may be easily secured to and removed from conventional externally mounted rear view mirrors for automotive vehicles.

A still further object of this invention is to provide a rear view attachment designed and adapted for the removal of surplus moisture, or condensate, the attachment being non-complex in construction and inexpensive to manufacture, and readily applied to or removed from such mirrors.

Other and further objects and advantages of the instant invention will become apparent from a consideration of the following specification when read in the light of the annexed drawings, in which:

Fig. 1 is a rear elevation of one embodiment of this invention, illustrating a condensation removing attachment, or air scoop, secured to a substantially circular rear view mirror of conventional construction positioned externally of a vehicle body;

Fig. 2 is a front elevation of the attachment shown in Fig. 1;

Fig. 3 is a cross-sectional view of the attachment shown in Figs. 1 and 2, and taken on the line 3—3 in Fig. 2;

Fig. 4 is a rear elevation of a second embodiment of a condensation removing attachment for rear view mirrors, and is shown as being mounted on a substantially rectangular rear view mirror of conventional construction positioned externally of an automotive vehicle body; and Fig. 5 is a rear elevation of another modification of the invention, the condensation removing attachment shown therein, being removably mounted on a substantially circular rear view mirror of conventional construction also positioned externally of a vehicle body.

Referring now more specifically to Figs. 1 to 3, inclusive, of the drawings, reference numeral 1 designates a support arm for a conventional rear view mirror indicated in general by the reference numeral 3 and positioned externally of an automotive vehicle. One end of the support 1 is connected on the vehicle in any convenient place and by any suitable means, while the other end thereof receives therethrough one end of a threaded mirror-mounting shaft 7. As is clearly seen in Fig. 3, the mirror 3 is detachably clamped on the supporting arm 1 by means of threaded nuts 9 and 11, and a lock washer 13.

Inasmuch as this invention does not pertain to the construction of the mirror 3, per se, and since the same is conventional in all respects and may be purchased on the open market, the specific structural details thereof will be omitted, it being noted herein only that the mirror 3 comprises a reflector 15 having a reflecting surface which is shown as circular in configuration and is mounted in a substantially circular casing 19, which is connected through a universal joint 21 with the other end of the shaft 7.

The invention may be applied to any suitable form of mirror, either of the type described or otherwise. The one shown in Figs. 1 to 3 is merely for purpose of illustration.

It will be understood that while the supporting arm 1 and the mirror 3 are generally mounted adjacent the driver's side of the vehicle body, the same may be mounted on either or both sides thereof, and that other suitable means could be utilized to mount the mirror. The universal joint 21 usually is provided to permit adjustment of the mirror to any desired position whereby the user is afforded a clear reflection of the traffic conditions immediately behind the vehicle upon which the mirror is mounted.

One embodiment of the condensation removing attachment or air scoop to which this invention pertains, is illustrated in Figs. 1 to 3, inclusive, and comprises a wind resistant air scoop designated, in general, by the reference numeral 23, which is removably supported by a wire bracket indicated at 25, and detachably connected to the rear view mirror 3.

From Figs. 2 and 3, it is clearly seen that the wire bracket 25 is formed of a length of relatively stiff wire. The wire bracket 25 is formed by bending the wire at two spaced points intermediate its ends to form vertically spaced loops 27 (see Fig. 2) adapted to receive therein and flexibly clamp against the mirror casing 19 adjacent its periphery and at one side thereof. The adjacent ends of the loops 27 are integrally connected by a vertically extending cross brace 29, while the other ends of the loops 27 continue in a pair of spaced laterally extending and diverging arms 31. As seen in Figs. 2 and 3, the arms 31 extend across the mirror casing 19 and are reversely bent intermediate their respective ends to form the loops 33 and 35. The loops 33 are inverted and oppositely disposed with respect to the loops 27, the former being adapted to receive therein and flexibly clamp against the mirror casing 19 adjacent its periphery on the opposite side thereof.

The arms 31 continue in portions 37 which are contained in spaced substantially parallel horizontal planes and which lie in a common vertical plane inclined at an angle (see Fig. 3) toward the reflector 15. The portions 37 are bent at 39 to form extensions 41, the free ends of the latter terminating in hooks 43 which are inverted and oppositely disposed with respect to the loops 35.

An air scoop 45, shown as comprising a vertically elongated, substantially rectangular sheet of transparent and substantially stiff plastic material, is clamped between the inverted and opposed loops or hooks 35 and 43. As is seen in Fig. 3, the air scoop 45 is bent at 47 to form an air deflecting portion 49 whereby air striking thereagainst is diverted laterally thereacross as the vehicle moves in a forward direction. To prevent fluttering or vibration of the air scoop due to variations in air pressure, the deflecting portion 49 is constructed to lie tangent to the wire bracket extensions 41.

As is seen in Figs. 1 and 3, the air scoop 23 is inclined at an angle to the reflector 15 and extends across a relatively small side portion thereof in spaced relationship, whereby air striking against the air scoop 23 is diverted laterally to flow across the surface 17 of the reflector 15.

Means for detachably securing the wire bracket 25 on the mirror 3 is shown in Fig. 2 and comprises a vertically extending wire link 53 looped at its opposite ends 55 around the laterally extending arms 31 for sliding movement thereon, and in this embodiment of the invention the link 53 is shown as being positioned adjacent the loops 33. A pair of links 57 are looped at one of their respective ends 59 around the lateral arms 31, and the other ends of the links 57 terminate in eyes 61 through which is passed a bolt 63 detachably and adjustably securing the same together.

Having described this form of the condensation removing device in detail the manner in which the same is secured to and detached from the rear view mirror is deemed obvious from a consideration of the foregoing specification. However, in the interest of clarity, this procedure will be briefly set forth below.

When it is desired to detach and remove the attachment from the mirror, this may be done readily. The wire 53 may be removed laterally to the right, as viewed in Fig. 2, permitting the loops 33 to flex outwardly away from each other. When this action takes place, the wire bracket 25 is then moved laterally to the right a distance sufficient to permit the loops 27 to be flexed over the adjacent portions of the periphery of the casing 19, and the wire bracket 25 is then moved laterally to the left, as viewed in Fig. 2, to disengage the loops 33 from their respective adjacent portions of the other side of the casing 19.

The air scoop 23 may be applied to and secured on the mirror 3 by reversing the above procedure. It having been connected to the mirror 3, forward movement of the vehicle causes air to impinge thereagainst and be diverted to flow across and clear the surface 17 of the mirror 15 of any condensation products which may accrue thereon.

In applying the accessory, the wire links 57 and the bolt 63 cooperate with the wire bracket 25 to position the loops 27 and 33 properly during the original installment of the accessory, whereby the wire 53 need only be operated thereafter to secure or detach the accessory to the mirror 3. If desired, however, the bolt 63 may be loosened or tightened to cooperate with the wire 53 to facilitate the detachment or replacement of the air scoop 23 on the mirror 3.

Fig. 4 illustrates a second embodiment of this invention. As shown therein, a vertically elongated, substantially rectangular mirror 67 is externally mounted on a vehicle in any suitable manner as, for example, by a conventional bracket arm, or the means disclosed in Figs. 1 to 3, inclusive. In this embodiment, the air scoop 69 is formed of a sheet of substantially rigid, transparent plastic material. The air scoop 69 is substantially rectangular in configuration and vertically elongated. As in the first embodiment, the air scoop 69 is provided with a preformed forwardly projecting marginal side 71 to divert air laterally across the air scoop, passing under its opposite side 73 to flow across the surface of the mirror 67 to remove condensation products therefrom, in the manner described above.

Means for detachably securing the air scoop 69 to the mirror 67 is shown as comprising a pair of vertically spaced clamps 75 rigidly secured to marginal portions of the side 73, as by the rivets 77. The free ends 79 of the clamps 75 are adapted for engagement against opposite sides of the mirror 67 to rigidly support the air scoop 69 thereon, with the side 73 extending over a portion of the adjacent side of the mirror 67 in spaced relation thereto.

Fig. 5 illustrates another modification of the invention. As shown therein, the air scoop is designated at 81 and is formed of a transparent plastic material having a high degree of rigidity. In this embodiment, the air scoop 81 is substantially ovate in configuration, with its major axis being substantially vertical.

The air scoop 81 is provided with a preformed, forwardly projecting side portion 83 which, upon forward movement of the vehicle, diverts air impingement thereagainst to flow under the lip portion 85 which extends across and is spaced from a portion of the surface of the mirror 3 to flow thereacross. The air stream then moves the particles of condensate as described above.

The other side of the air scoop 81 is provided with clamping means adjacent its upper and lower edges for detachably securing the air scoop on the mirror 3. The clamps are identical in construction and function to those in Fig. 4, and hence no further description is required.

While the air scoops described above are stated as being formed of plastic materials, it will be understood that any other material may be employed which possesses sufficient resistance against bending or breaking under air pressure built up as the vehicle is in motion, and it should, preferably, be transparent in order to afford the vehicle operator unobstructed vision.

In each of the embodiments illustrated and described, the plane of the accessory sheet is at an acute angle to the face of the mirror, and each sheet also has a forwardly turned portion at an angle thereto, or curved in convex fashion so as to form an air scoop that will trap the air and divert it laterally onto the rear face or reflecting portion of the mirror. The air scoop also overlaps a portion of the mirror surface at the rear of the latter so as to cause the air to be diverted transversely of the mirror surface, as will be apparent from Fig. 3, and which is true also in each of the other forms.

In this way the air will be directed in a stream across the mirror surface with sufficient force to maintain the surface free and clear of accumulation of condensation thereon caused by fog, moisture or otherwise, thereby maintaining a clear reflecting surface for the operator of the vehicle.

While the attachment is located between the operator and the mirror, it will not interfere with his vision nor the effective use of the mirror. The mirror is usually set at an angle to the length of the vehicle so as to dispose the attachment forward thereof. At the same time, the attachment is formed of the transparent material which allows clear vision therethrough. The attachment can be applied thereto very simply and readily, and manufactured at low cost. It will afford a material advantage to truck drivers, particularly, and other operators of vehicles especially during all kinds of weather.

Having described this invention in detail, it will be understood that the embodiments thereof earlier described and illustrated are for the purpose of example, and that the invention is to be limited only by the scope of the appended claims.

I claim:

1. An air scoop for removing condensation from an externally mounted vehicle rear view mirror, said air scoop comprising a sheet of material, and a wire bracket for releasably mounting said air scoop on said mirror, said bracket having a set of opposed, inverted, integral loops formed therein to clamp releasably said mirror therebetween, a second set of opposed, inverted, integral loops releasably clamping against a pair of laterally opposed sides of said sheet therebetween, and means cooperating with said bracket to releasably lock said first set of clamps on said mirror.

2. An externally mounted circular vehicle rear view mirror, an air scoop for removing condensation from said mirror, said air scoop comprising a rectangular sheet of substantially rigid and transparent material, said sheet having a marginal edge portion thereof projecting at an angle to the plane of said sheet, and a bracket releasably securing said sheet on said mirror, said bracket comprising a length of wire having a pair of spaced crimped and looped portions intermediate its ends for clamping engagement against one side of said mirror, a pair of spaced, reversely curved portions having a curved section of each inverted and oppositely disposed with respect to said looped portions to engage and clamp against the other side of said mirror, and said wire bracket having the free end portions inclined at an angle to said mirror and having looped termini inverted and oppositely disposed with respect to the other curved sections to releasably clamp against opposite edges of said air scoop and to support said air scoop on said mirror with a marginal portion adjacent one side of said sheet being extended across a portion of said mirror in spaced relation therefrom.

References Cited in the file of this patent

UNITED STATES PATENTS

| | | |
|---|---|---|
| 440,493 | Morris | Nov. 11, 1890 |
| 1,301,150 | Martin | Apr. 22, 1919 |
| 1,677,711 | Dely | July 17, 1928 |
| 1,750,789 | Thompson | Mar. 18, 1930 |
| 1,859,080 | Edwards | May 17, 1932 |
| 2,079,203 | Fagerburg | May 4, 1937 |
| 2,121,144 | Fischer | June 21, 1938 |
| 2,165,771 | Vlasak | July 11, 1939 |
| 2,326,316 | Allen | Aug. 10, 1943 |
| 2,338,780 | Poncher et al. | Jan. 11, 1944 |
| 2,442,504 | Miller | June 1, 1948 |
| 2,473,698 | Aves | June 21, 1949 |
| 2,561,778 | Bohnenblust | July 24, 1951 |
| 2,594,682 | Ritch | Apr. 29, 1952 |
| 2,629,286 | Budreck | Feb. 24, 1953 |
| 2,636,419 | Kerr | Apr. 23, 1953 |